United States Patent [19]
Nylykke

[11] 4,099,729
[45] Jul. 11, 1978

[54] STUFFING BOX BACKSTOP RING

[75] Inventor: Hans Peter Glud Nylykke, Sonderborg, Denmark

[73] Assignee: Danfoss A/S, Nordborg, Denmark

[21] Appl. No.: 809,157

[22] Filed: Aug. 12, 1977

Related U.S. Application Data

[63] Continuation-in-part of Ser. No. 697,671, Jun. 18, 1976, abandoned, and Ser. No. 697,672, Jun. 18, 1976, abandoned.

[30] Foreign Application Priority Data

Feb. 6, 1976 [DK] Denmark .................. 483/76
Jun. 18, 1975 [DK] Denmark .................. 2742/75

[51] Int. Cl.² ............................................. F16J 15/34
[52] U.S. Cl. ................................. 277/96.1; 277/133; 277/94
[58] Field of Search .............. 277/15, 133, 134, 81 R, 277/96 R, 96.1, 96.2, DIG. 6, 235 R, 235 A, 83, 94, 215

[56] References Cited

U.S. PATENT DOCUMENTS

| 3,109,658 | 11/1963 | Barrett et al. ............ 277/96 X |
| 3,572,730 | 3/1971 | Otto et al. ............ 277/134 X |
| 3,586,340 | 6/1971 | Otto et al. ............ 277/134 X |
| 3,601,413 | 8/1971 | Darnell ............ 277/96.2 |
| 3,744,805 | 7/1973 | Heinrich ............ 277/133 X |
| 3,749,412 | 7/1973 | Lingley ............ 277/96.1 X |
| 3,810,637 | 5/1974 | Bonvin ............ 277/96.2 |
| 3,894,741 | 7/1975 | McHugh ............ 277/96.1 X |

FOREIGN PATENT DOCUMENTS 751,297 6/1956 United Kingdom ............ 277/134

Primary Examiner—Robert S. Ward, Jr,

[57] ABSTRACT

The invention relates to a backstop ring for a stuffing box or the like which is cooperable with a carbon sealing ring. The main parts of a stuffing box are normally the stationary backstop ring and the carbon slide ring which rotates with the shaft. These two rings have mutually engaging sealing surfaces. The sealing surface of the stationary backstop ring is ground in a manner to form scratches which are orientated to create a radially outward pumping effect. The flatness of the ground surface has an overall variation of less than six microns and preferably is between 2 and 5 microns. The scratches have a roughness between 0.2 and 2 microns. For scratches on the order of 1 to 2 microns the surface is phosphatized.

6 Claims, 2 Drawing Figures

STUFFING BOX BACKSTOP RING

This is a continuation-in-part application of patent application Ser. Nos. 697,671 and 697,672 both filed on June 18, 1976 and both abandoned.

The invention relates to a stuffing box backstop ring wherein the ring is of metal and wherein a rotary slippage seal ring of carbon bears against the backstop ring by means of a strong spring fitted in the stuffing box housing.

In connection with slippage seals for oil pumps, the stuffing boxes are known often to be liable to leak because the slippage seals are never absolutely right. They may often leak 3–4 drops of oil in 24 hours, which leakage has been considered acceptable so far. However, in connection with modern oil burners such leakage has proved unacceptable because the furnace room is also used for other purposes. Further, the oil pump does not fit very well into the new compact burners used in modern oil-heating plants, so the leakage can no longer be removed via the air for the burner.

Therefore, attempts have been made to make the slippage-seal surface as plane as possible through a so-called lapping process, on the supposition that the smoother the surface, the smaller the leakage. However, tests have proved that this process does not always give the desired results in spite of careful performance, including repeated washing, cleaning, etc. before grinding.

Further, an already known method is to provide stuffing boxes for pumps with backstop rings with helical grooves or round, outward-oriented grooves with a pumping effect, the orientation being decided by the pumping effect and the speed of rotation desired. Normally, these grooves end before the rim of the backstop ring. It is true that this gives a comparatively tight stuffing box when dynamically affected, but as a pump should be tight also when stopped, i.e. statically tight, such a solution is useless.

Common to the above methods was the drawback that they did not give the desired result, particularly in case of mass production of pumps for oil burners.

It is the object of the present invention to specify an inexpensive slippage-seal surface in which the said leakage drawbacks have been absolutely eliminated.

According to the invention this is obtained when the surface of the backstop ring, on the side operating together with the slippage-seal ring, is provided with well-oriented scratches, the latter being oriented so as to give a pumping effect towards the fluid in the stuffing box and the surface is then phosphorus-coated through phosphatization for scratch roughness between 1 and 2 microns but equivalent results are obtained for a scratch roughness between 0.2 and 0.8 microns without phosphatization.

The combination of the two processes has proved to provide the required seal so that not one drop will leak even after the pump has been run for several days and nights, giving a stuffing box which is both statically and dynamically tight. The dynamic tightness is obtained through the orientation of the scratches, providing them with a pumping effect causing possible oil to be pumped back to the shaft and into the oil pump, and the phosphatization has the effect that when the backstop ring operates together with the carbon ring, the spaces between the scratches will be partly filled with a combination of phosphorus and carbon, retaining the pumping effect and constantly grinding the units while the backstop ring and the carbon ring rotate against each other.

According to the invention, it is an advantage that the phosphatization-applied coating has a thickness of about 3–5$\mu$.

At the same time it is the object of the invention to specify a method for construction of a backstop ring, so that the price of such a construction will be considerably lower than the price of backstop rings known so far. According to the method, this is obtained when the backstop ring is provided, through a grinding process, with well-oriented scratches, and when the scratches are oriented so as to give a pumping effect towards the fluid in the stuffing box, and when the backstop ring rotates during the grinding process and when the backstop ring has the same direction of rotation as the grindstone, or the opposite direction, depending on use in a pump rotating anti-clockwise or clockwise, and is ground only in one half to the center.

Other objects and advantages of the invention will become apparent from the following specification, drawings and appended claims.

In the drawing:

FIG. 1 shows a pump shaft 2, fitted in a bearing and seal-extended from a pump casing 1.

Figure 1:
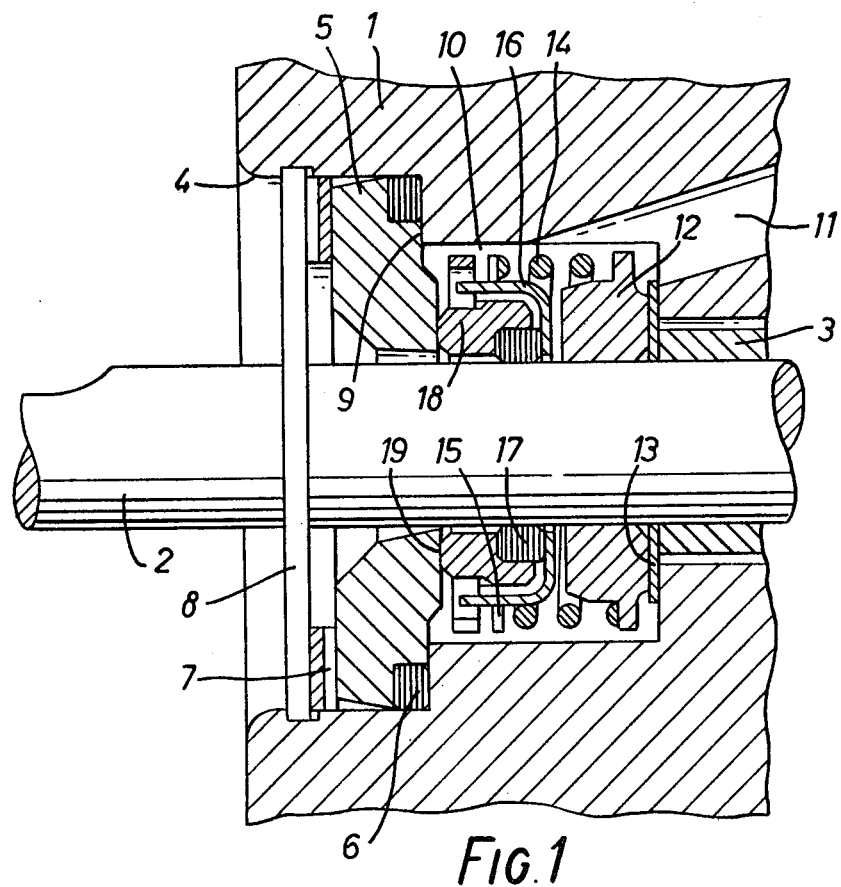
FIG. 1 is a cut-away section of an oil-pump casing with hatch indication of the slippage seal.

A recess 4 in the casing holds a backstop ring 5 of cast iron or other metal. In its outer circumference the ring has a groove in which there is an elastic sealing ring 6. By means of the corrugated annular spring 7, supported on a retaining collar 8, the backstop ring 5 with a contact face 9 is pressed against a press face 20 of the recess 4, at right angles to the shaft, and thereby the sealing ring 6 is simultaneously pressed against the press face 20. The backstop ring 5 closes an internal chamber 10 which can be filled with oil and which is, via a duct 11, connected to the suction side of the pump. Fastened on the shaft 2 there is in the chamber a supporting collar 12 of metal, supported via a slide washer 13 by the inner face of the chamber 10. One end of a spring 14 bears against the supporting collar 12, and the other end against projections 15 of the thrust collar 16. Via a sealing ring 17 the thrust collar actuates a slide ring 18 of carbon. The spring 7 is about ten times as strong as the spring 14.

Contact between the backstop ring 5 and the carbon ring 18 is along the slide face 19. In the plane of the slide face 19, which is at right angles to the shaft, the carbon ring has the smaller cross-sectional area. The backstop ring 5 is of metal, preferably of cast iron. Its slide face 19 is ground with oriented scratches 20, and then the face 19 is phosphatized with a phosphorus coating of 2$\mu$. No other surfaces of the backstop ring are treated.

Figure 2:
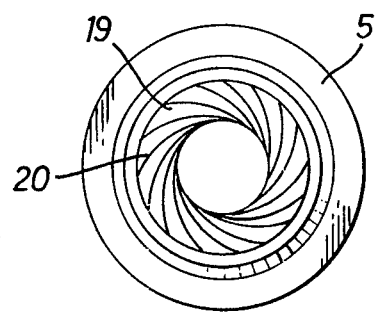
FIG. 2 is the surface of the slippage-seal ring with the oriented scratches.

FIG. 2 shows the backstop ring with its slide face 19 and the oriented, ground scratches 20. For one embodiment of the invention the scratches 20 have a roughness of about 1–2$\mu$ and are oriented so as to give a pumping effect when the shaft rotates. The pumping effect is towards the center of the stuffing box. After the scratches 20 have been made, the surface 19 is phosphatized with a coating of about 2$\mu$.

For a second embodiment of the invention, phosphatization is not necessary if only the surface of the backstop ring presents more or less equally oriented grinding patterns from the inner boundary to the outer boundary of the ring, and the grinding pattern has a roughness of 0.2–0.8μ, and the ring has a planeness of less than 6μ measured in circumference.

Because of its oriented grinding patterns the stuffing box is dynamically tight, and also statically when the tolerances of roughness and planeness are observed, which makes its production cheaper because the extra process of phosphatization is now unnecessary.

According to the second embodiment of the invention it is a particular advantage if the grinding patterns have a roughness of 0.2–0.6μ, measured in circumference.

I claim:

1. A backstop ring for a stuffing box or the like adapted to cooperate with a carbon sealing ring to provide sealing for dynamic and static operation, comprising, an annularly shaped member having a generally flat sealing surface, said surface having characteristic grinding marks orientated to cause fluid to be pumped in a selected radial outward direction, the flatness of said sealing surface having a deviation of less than six microns and said marks having roughness between 0.2 and 2 microns.

2. A backstop ring according to claim 1 wherein said flatness deviation is between 2 and 5 microns.

3. A backstop ring according to claim 2 wherein said marks have a roughness between 0.2 and 0.8 microns.

4. A backstop ring according to claim 1 wherein said surface has a phosphorous coating.

5. A backstop ring according to claim 4 wherein said marks have a roughness between 1 and 2 microns.

6. A backstop ring according to claim 4 wherein said coating has a thickness of about 2 microns.

* * * * *